(12) United States Patent
Lei et al.

(10) Patent No.: US 12,283,861 B1
(45) Date of Patent: Apr. 22, 2025

(54) OSCILLATING SWING MOTOR

(71) Applicant: NINGBO GAOLI ELECTRONIC TECHNOLOGY CO., LTD., Ningbo (CN)

(72) Inventors: Chunhuo Lei, Ningbo (CN); Jun Xiao, Ningbo (CN); Yizhong Gao, Ningbo (CN)

(73) Assignee: NINGBO GAOLI ELECTRONIC TECHNOLOGY CO., LTD., Ningbo (CN)

( * ) Notice: Subject to any disclaimer, the term of this patent is extended or adjusted under 35 U.S.C. 154(b) by 0 days.

(21) Appl. No.: 18/989,005

(22) Filed: Dec. 20, 2024

(30) Foreign Application Priority Data

Dec. 20, 2023 (CN) .......................... 202323477180.6

(51) Int. Cl.
*H02K 33/16* (2006.01)
*H02K 1/22* (2006.01)

(52) U.S. Cl.
CPC .............. *H02K 33/16* (2013.01); *H02K 1/22* (2013.01)

(58) Field of Classification Search
CPC ........ H02K 33/16; H02K 33/00; H02K 35/00; H02K 35/02; H02K 1/22
See application file for complete search history.

(56) References Cited

U.S. PATENT DOCUMENTS

| | | | |
|---|---|---|---|
| 2018/0141224 A1* | 5/2018 | Todd | B26B 19/282 |
| 2018/0338598 A1* | 11/2018 | Hu | B24B 23/00 |
| 2018/0361601 A1* | 12/2018 | Hu | H02K 33/16 |
| 2020/0136545 A1* | 4/2020 | Hu | H02P 25/032 |
| 2021/0408863 A1* | 12/2021 | Todd | B26B 19/284 |

FOREIGN PATENT DOCUMENTS

CN 218063249 U 12/2022

* cited by examiner

*Primary Examiner* — Tulsidas C Patel
*Assistant Examiner* — Robert E Mates
(74) *Attorney, Agent, or Firm* — Bayramoglu Law Offices LLC

(57) ABSTRACT

An oscillating swing motor includes a first swing lever and a second swing lever that are pivotally connected to each other, where a coil fastening base for winding a coil is arranged below the first swing lever and the second swing lever, stators are arranged inside the coil fastening base, rotors are arranged on the top of the coil fastening base in a floating manner, two rotors are symmetrically arranged, one end of each of the first swing lever and the second swing lever facing the coil fastening base is driven by the rotor to perform magnetic induction alternating reciprocating motion, a linkage member is further arranged between the first swing lever and the second swing lever, and the linkage member enables either of the first swing lever and the second swing lever to drive the other swing lever to swing in an opposite direction when swinging.

7 Claims, 6 Drawing Sheets

OSCILLATING SWING MOTOR

CROSS REFERENCE TO THE RELATED APPLICATIONS

This application is based upon and claims priority to Chinese Patent Application No. 202323477180.6, filed on Dec. 20, 2023, the entire contents of which are incorporated herein by reference.

TECHNICAL FIELD

This application relates to the field of motor technologies, and more specifically, to an oscillating swing motor.

BACKGROUND

In a process of using a hair clipper, a blade used for cutting hair needs to move reciprocally at a high frequency. This process needs to be completed with the help of a motor and a transmission structure. For the foregoing description, a commonly used transmission structure is usually as follows: The motor drives an eccentric wheel to rotate at a high speed, and the eccentric wheel is connected to an end of a blade holder, to drive the blade to move reciprocally at a high frequency. Alternatively, the motor drives a swinging-type rocker member, and an end of the rocker member outputs a high-frequency action.

However, a current rocking-type swing motor has the following problem: Reciprocating swinging of the rocker member is usually driven by a rotor of the motor. However, reciprocating motion of the rotor can utilize forces of only half of coils of the motor, and forces of the other half of the coils of the rotor cannot be utilized. Consequently, motor efficiency is wasted, and a volume of the motor needs to be set relatively large.

SUMMARY

An objective of this application is to provide an oscillating swing motor that can improve motor efficiency.

The foregoing objective is implemented by using the following technical means: An oscillating swing motor includes a first swing lever and a second swing lever that are pivotally connected to each other, where a coil fastening base for winding a coil is arranged below the first swing lever and the second swing lever, stators are arranged inside the coil fastening base, rotors are arranged on the top thereof in a floating manner, two rotors are symmetrically arranged, one end of each of the first swing lever and the second swing lever facing the coil fastening base is driven by the rotor to perform magnetic induction alternating reciprocating motion, a linkage member is further arranged between the first swing lever and the second swing lever, and the linkage member enables either of the first swing lever and the second swing lever to drive the other swing lever to swing in an opposite direction when swinging.

Further improvement is as follows: A magnetic conductive block is arranged on a side of each of the first swing lever and the second swing lever opposite to the rotor, and the rotor is embedded in the magnetic conductive block.

Further improvement is as follows: The oscillating swing motor further includes a housing, and the housing has a lower chamber for placing the coil fastening base and an upper chamber for accommodating the first swing lever and the second swing lever.

Further improvement is as follows: The first swing lever and the second swing lever are connected to each other in series with a pivot shaft at one ends away from the rotors, and the pivot shaft is fastened to the upper chamber.

Further improvement is as follows: An upper end of the upper chamber is provided with an avoidance groove, and the other end of the second swing lever opposite to the rotor is fastened with a driving rod after extending upward out of the avoidance groove.

Further improvement is as follows: Springs are arranged between sidewalls of the upper chamber and two sides of the first swing lever and the second swing lever in a swing direction, and the springs drive the first swing lever and the second swing lever to be in a balanced position.

Further improvement is as follows: The linkage member is a shift fork, a rotation center of the shift fork is rotatably connected to the upper chamber, two forks are respectively formed by using the rotation center of the shift fork as a center of symmetry, a first linkage column is arranged on the first swing lever, a second linkage column is arranged on the second swing lever, and the first linkage column and the second linkage column are respectively located on the two forks of the shift fork.

In comparison with the conventional technology, advantages of this application are as follows: First, based on a magnetic induction principle, after positive and negative alternating currents are introduced into a magnetic induction coil, two rotors are enabled to move alternately and reciprocally under the action of stators. When the rotors move, a first swing lever and a second swing lever are driven to alternately swing. In addition, due to arrangement of a linkage member, namely, a shift fork, when the first swing lever swings, the second swing lever is assisted in swinging in another direction. In addition, swinging of the second swing lever may be further driven by the rotor located thereunder, thereby improving electromagnetic efficiency of the coil.

Second, the first swing lever and the second swing lever simultaneously apply acting forces on springs. On the one hand, it plays a cushioning role. On the other hand, when the applied forces reaches a critical value, the springs synchronously apply reaction forces, namely, rebound forces, so that when the motor drives the shift fork, and the first swing lever and the second swing lever move toward each other, the shift fork itself swings accordingly, increasing a torsion force.

Third, an arranged magnetic conductive block, on the one hand, is used to fasten the rotors, and on the other hand, can keep a magnetic path always conductive, thereby improving process performance of running the motor.

Figure 1:
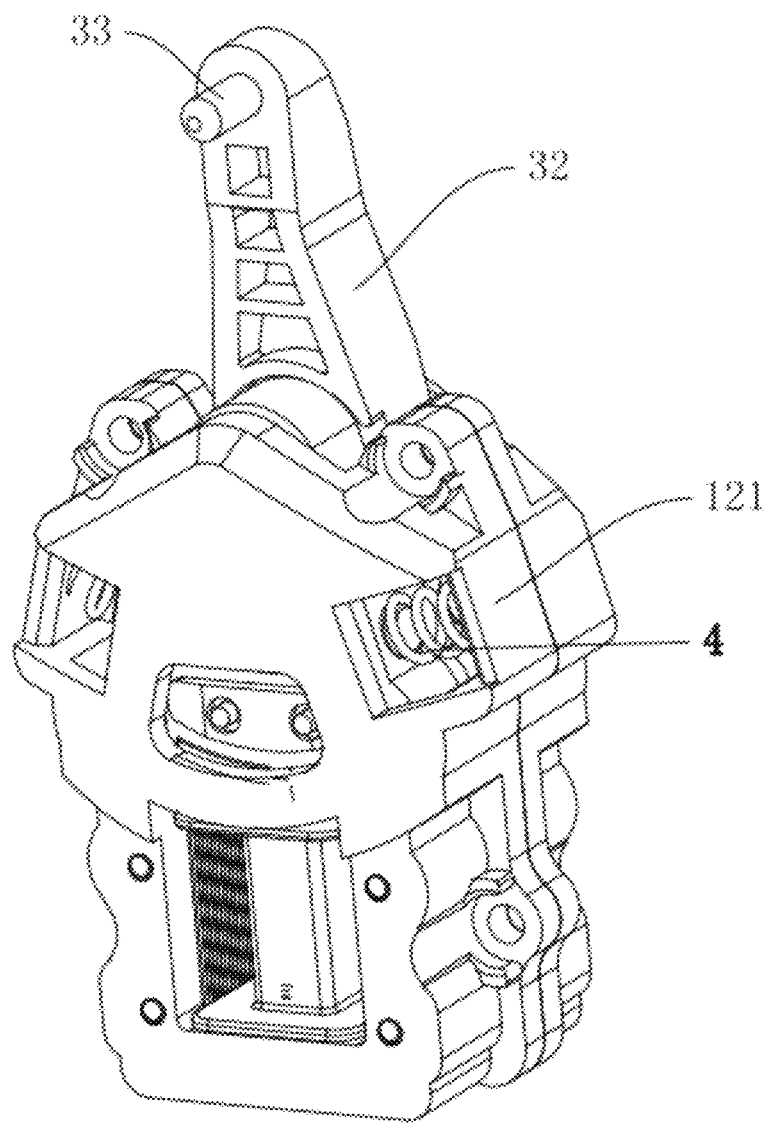
FIG. 1 is an overall schematic diagram of an oscillating swing motor according to an embodiment.
Figure 2:
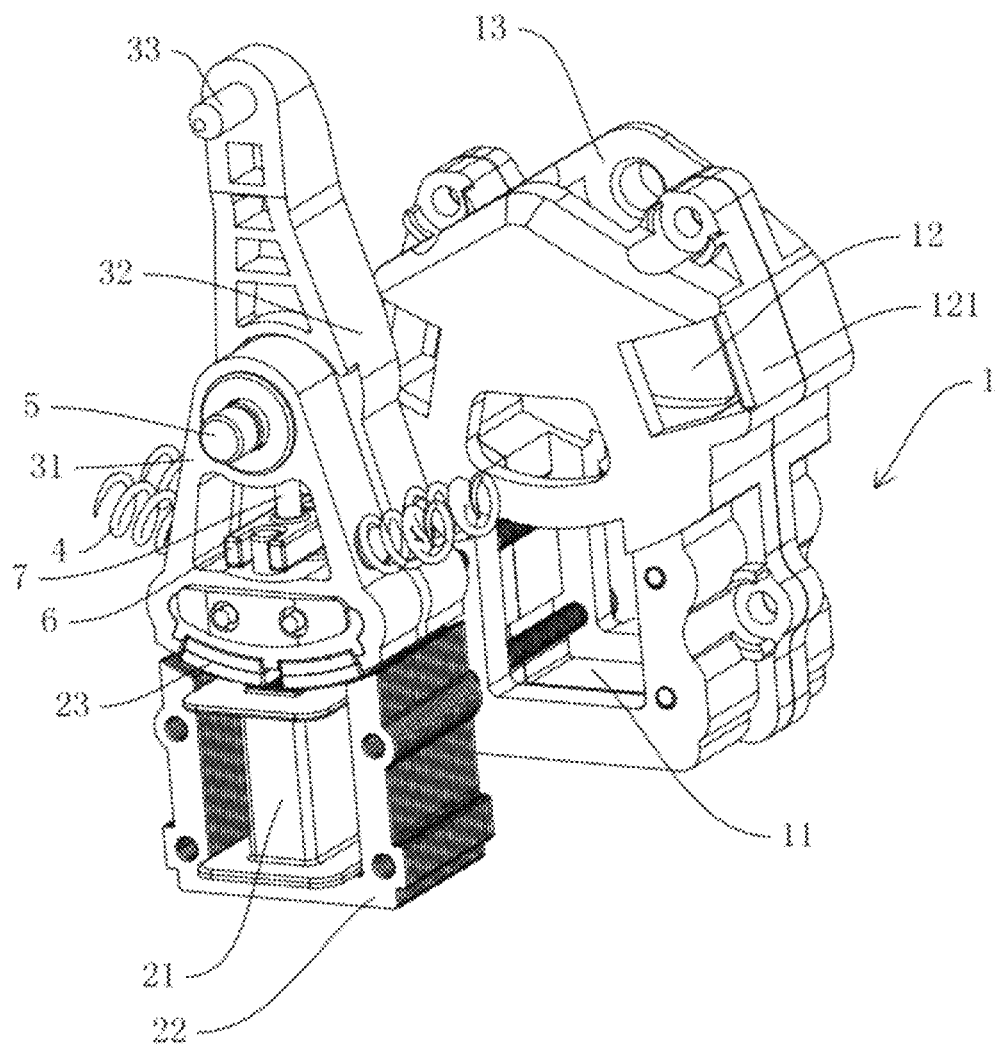
FIG. 2 is a schematic diagram of separating a housing from internal components according to an embodiment.

In the figures, 1. housing; 11. lower chamber; 12. upper chamber; 121. abutment wall; 13. avoidance groove; 21. coil fastening base; 22. iron core; 23. first rotor; 31. first swing lever; 311. first linkage column; 312. pivot hole; 32. second swing lever; 321. second linkage column; 33. driving rod; 4. spring; 5. pivot shaft; 6. shift fork; 7. fixed shaft; 8. first magnetic conductive block.

DETAILED DESCRIPTION OF THE EMBODIMENTS this application is further described in detail below with reference to the accompanying drawings and specific embodiments. The following embodiments are only descriptive and not restrictive, and cannot be used to limit the protection scope of this application.

Embodiment

Referring to FIG. 1 to FIG. 4, an oscillating swing motor includes a housing 1 and components arranged inside. The housing 1 has a lower chamber 11 and an upper chamber 12. A coil fastening base 21 is fastened in the lower chamber 11, and the coil fastening base 21 is externally wound with a coil (not shown in the figure). A stator is formed by an E-shaped iron core 22. A first stator and a second stator are separately arranged on an upper part of the coil fastening base 21 in a floating manner.

A first swing lever 31 and a second swing lever 32 are arranged in the upper chamber 12. The first swing lever 31 and the second swing lever 32 are separately provided with a pivot hole 312, and are rotatably arranged in the upper chamber 12 by using a pivot shaft 5. An upper part of the second swing lever 32 is fastened with a driving rod 33 after extending upward out of an avoidance groove 13 of the housing 1. The driving rod 33 drives a blade to move at a high frequency to cut hair.

Figure 3:
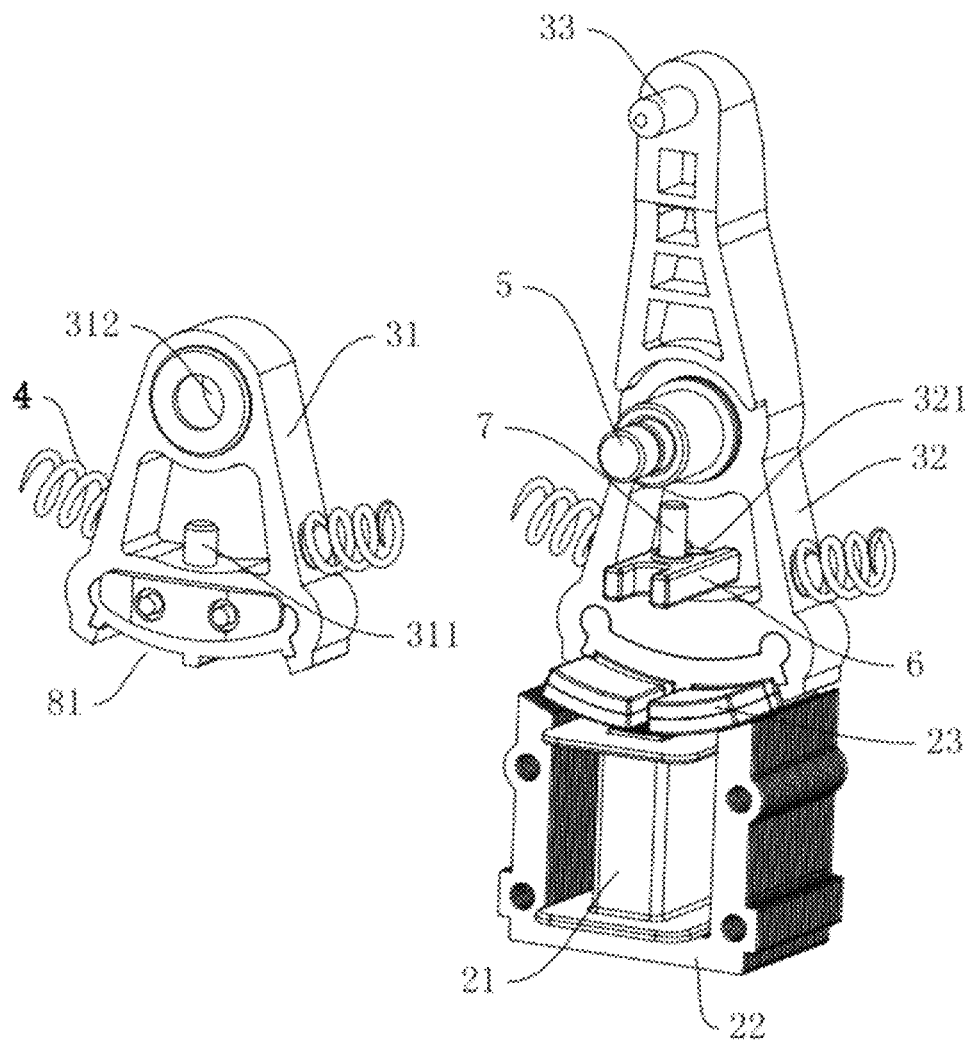
FIG. 3 is a schematic diagram of separating internal components from a first swing lever according to an embodiment.
Figure 4:
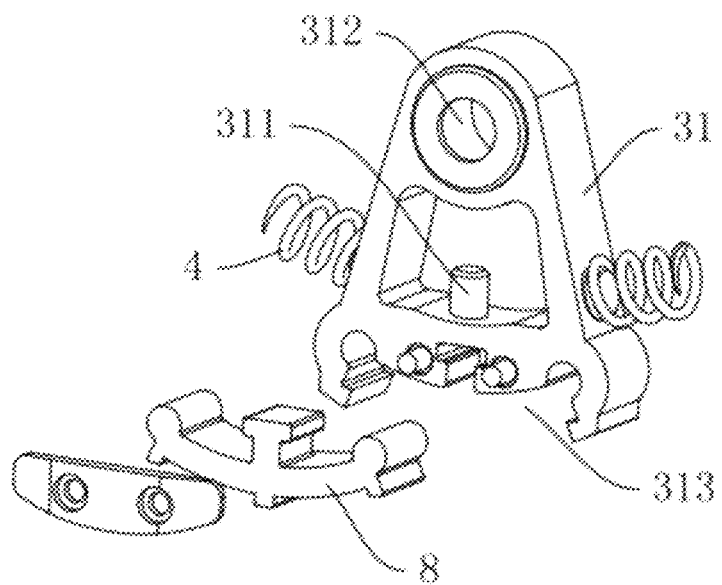
FIG. 4 is a schematic diagram of separating a first swing lever from a first magnetic conductive block according to an embodiment.

Still referring to FIG. 3 and FIG. 4, a first magnetic conductive block 8 and a second magnetic conductive block are fastened below the first swing lever 31 and the second swing lever 32, and a first rotor 23 and a second rotor are respectively embedded in the first magnetic conductive block 8 and the second magnetic conductive block. After the coil is energized, the first rotor 23 and the second rotor are respectively subjected to magnetic field forces in different directions, driving the first swing lever 31 and the second swing lever 32 to swing in opposite directions. Herein, a shift fork 6 is arranged between the first swing lever 31 and the second swing lever 32, a fixed shaft 7 is rotatably connected to a center of the shift fork 6, and the fixed shaft 7 is directly fastened in the upper chamber 12. Forks are respectively arranged at two ends of the shift fork 6, and the two forks match with a first linkage column 311 and a second linkage column 321. Therefore, when the first swing lever 31 swings, the second swing lever 32 is assisted in swinging in another direction. In addition, swinging of the second swing lever 32 may be further driven by the rotor located thereunder, thereby improving electromagnetic efficiency of the coil.

Further, to improve swing efficiency of the first swing lever 31 and the second swing lever 32, springs 4 are arranged between abutment walls 121 of the upper chamber 12 and two swing sides of the first swing lever 31 and the second swing lever 32, so that the first swing lever 31 and the second swing lever 32 simultaneously apply acting forces on the springs 4. On the one hand, it plays a cushioning role. On the other hand, when the applied forces reaches a critical value, the springs 4 synchronously apply reaction forces, namely, rebound forces, so that when the motor drives the shift fork 6, and the first swing lever 31 and the second swing lever 32 move toward each other, the shift fork 6 itself swings accordingly, increasing a torsion force.

Figure 5:
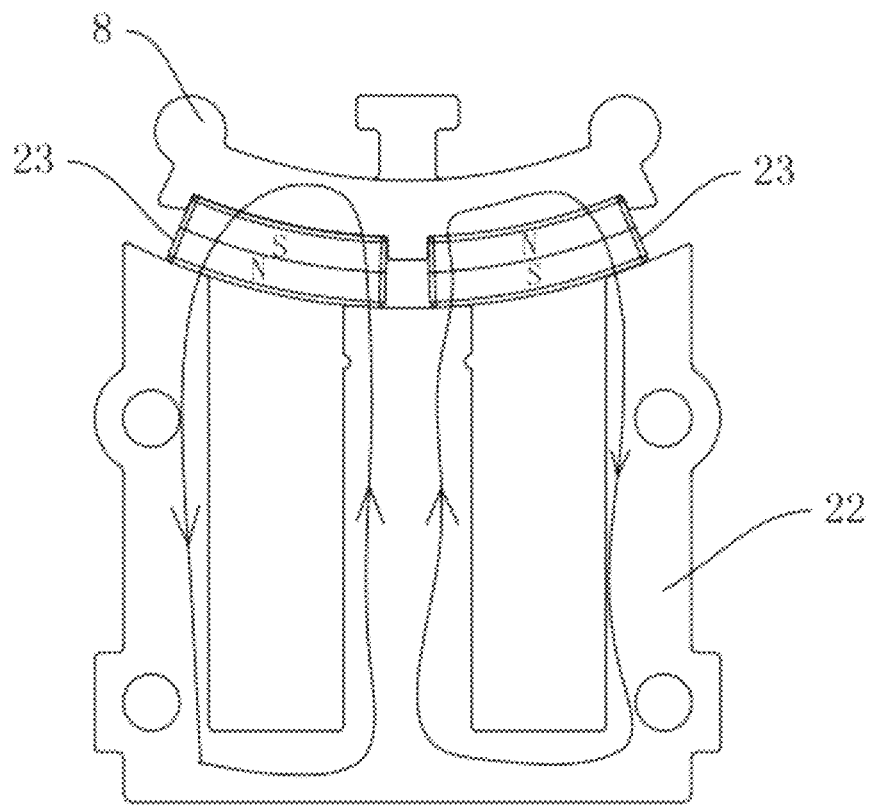
FIG. 5 is a schematic diagram of a magnetic path and a first magnetic conductive block when a coil is not energized according to an embodiment.
Figure 6:
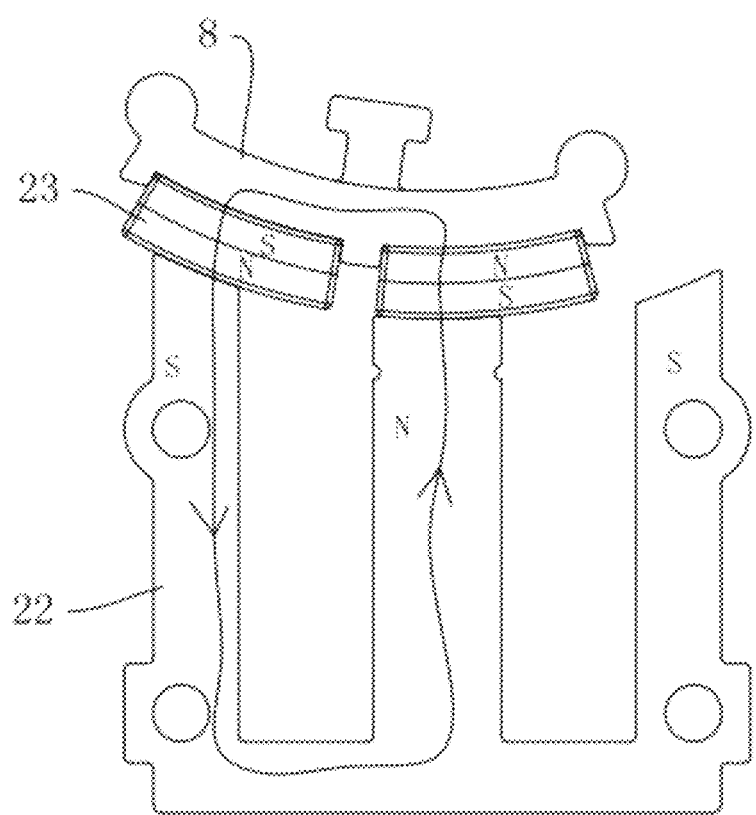
FIG. 6 and FIG. 7 are schematic diagrams of a magnetic path and a first magnetic conductive block when a coil is connected to circuits in different directions according to an embodiment.
Figure 7:
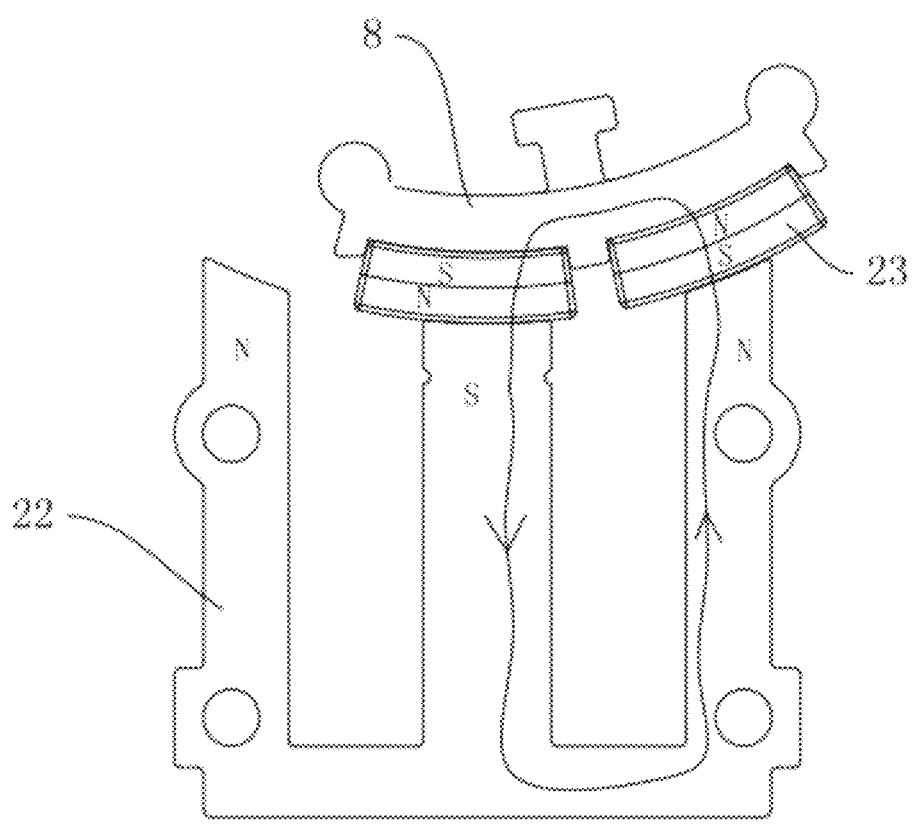

In use, referring to FIG. 5 to FIG. 7, there are two first rotors 23, which are embedded in a lower part of the first magnetic conductive block 8. In addition, N and S poles of the two first rotors 23 are arranged in opposite directions. First, when the coil is not energized, the E-shaped iron core stator 22 does not generate a magnetic pole. As shown in FIG. 5, in this case, the first magnetic conductive block 8 is located directly above the stator 22, and no motion is generated. When a reverse current is introduced into the coil, an induction magnetic field is formed between the coil and the stator under a magnetic effect of the current. As shown in FIG. 6, in this case, a middle part of the stator is an S pole, and two ends thereof are an N pole, so that the first rotor 23 deflects with the first magnetic conductive block 8. Similarly, the other second rotor moves in a reverse direction. After a current direction changes, the middle of the stator changes to the S pole, and the two ends thereof change to the N pole. Referring to FIG. 7, the first rotor 23 swings in another direction with the first magnetic conductive block 8, and the other second rotor moves in a reverse direction, thereby implementing alternating reciprocating motion in opposite directions. Movement of the rotors drives alternating movement of the first swing lever 31 and the second swing lever 32. In addition, by using a linkage member, it is ensured that motion of each rotor can provide an effective driving force, thereby improving utilization efficiency of the coil. In a high-frequency switching process, high-frequency swinging of the first swing lever 31 and the second swing lever 32 is implemented, thereby implementing a final high-frequency output of the driving rod 33.

The foregoing descriptions are only preferred implementations of this application, and the protection scope of this application is not limited to the foregoing embodiments. All technical solutions based on the idea of this application fall within the protection scope of this application. It should be noted that for a person of ordinary skilled in the art, several improvements and modifications may be further made without departing from the principle of this application, and the improvements and modifications should also be considered to fall within the protection scope of this application.

What is claimed is:

1. An oscillating swing motor, comprising a first swing lever and a second swing lever, wherein the first swing lever and the second swing lever are pivotally connected to each other, a coil fastening base for winding a coil is arranged below the first swing lever and the second swing lever, stators are arranged inside the coil fastening base, two rotors are symmetrically arranged on a top of the coil fastening base in a floating manner, a first end of the first swing lever and a first end of the second swing lever face the coil fastening base and are respectively driven by the two rotors to perform magnetic induction alternating reciprocating motion, a linkage member is further arranged between the first swing lever and the second swing lever, and the linkage member enables either of the first swing lever and the second swing lever to drive the other swing lever to swing in an opposite direction when swinging.

2. The oscillating swing motor according to claim 1, wherein magnetic conductive blocks are respectively arranged on a side of the first swing lever and a side of the second swing lever opposite to the two rotors, and the two rotors are respectively embedded in the magnetic conductive blocks.

3. The oscillating swing motor according to claim 1, wherein the oscillating swing motor further comprises a housing, and the housing has a lower chamber for placing the coil fastening base and an upper chamber for accommodating the first swing lever and the second swing lever.

4. The oscillating swing motor according to claim 3, wherein a second end of the first swing lever and a second end of the second swing lever face away from the two rotors and are connected to each other in series with a pivot shaft, and the pivot shaft is fastened to the upper chamber.

5. The oscillating swing motor according to claim 3, wherein an upper end of the upper chamber is provided with an avoidance groove, and a second end of the second swing lever opposite to the two rotors is fastened with a driving rod after extending upward out of the avoidance groove.

6. The oscillating swing motor according to claim 3, wherein springs are arranged between sidewalls of the upper chamber and two sides of the first swing lever and the second swing lever in a swing direction, and the springs drive the first swing lever and the second swing lever to be in a balanced position.

7. The oscillating swing motor according to claim 3, wherein the linkage member is a shift fork, a rotation center of the shift fork is rotatably connected to the upper chamber, two forks are respectively formed by using the rotation center of the shift fork as a center of symmetry, a first linkage column is arranged on the first swing lever, a second linkage column is arranged on the second swing lever, and the first linkage column and the second linkage column are respectively located on the two forks of the shift fork.

* * * * *